United States Patent [19]

Tardy

[11] Patent Number: 4,710,697
[45] Date of Patent: Dec. 1, 1987

[54] OFF-LINE SERIES TYPE REGULATING POWER SUPPLY

[75] Inventor: John Tardy, Somerville, N.J.

[73] Assignee: American Telephone and Telegraph Company AT&T Technologies, Inc., Berkeley Heights, N.J.

[21] Appl. No.: 847,939

[22] Filed: Apr. 3, 1986

[51] Int. Cl.<sup>4</sup> ............................................. G05F 1/44
[52] U.S. Cl. .................................. 323/239; 323/267; 323/274
[58] Field of Search ............... 323/235, 239, 267, 274, 323/284, 324

[56] References Cited

U.S. PATENT DOCUMENTS

| | | | |
|---|---|---|---|
| 3,201,597 | 8/1965 | Balan | 323/324 |
| 3,244,965 | 4/1966 | Gutzwiller | 323/324 |
| 3,287,623 | 11/1966 | Valancius | 323/267 |
| 4,061,961 | 12/1977 | Baker | 323/239 |
| 4,302,717 | 11/1981 | Olla | 323/324 |
| 4,368,419 | 1/1983 | Welty | 323/239 |
| 4,437,148 | 3/1984 | Suranyi | 323/274 |

Primary Examiner—Peter S. Wong
Assistant Examiner—Jeffrey Starrett
Attorney, Agent, or Firm—Alfred G. Steinmetz

[57] ABSTRACT

An off-line regulating power supply utilizes a regulating transistor which operates in a dissipative mode for only a portion of each half cycle of an input AC voltage in order to regulate an output voltage by truncating the input AC sinewave. This AC input signal is full wave rectified and coupled to a primary winding of a power transformer through the regulating transistor. One of a plurality of secondary windings is coupled to a voltage threshold detector which responds instantaneously to attainment of the threshold in each half cycle of operation to bias the regulating transistor from a saturated condition to an active dissipative impedance state which limits the output voltage to the threshold level. As the input AC sinewave peaks and declines in value, the regulating transistor is again biased into saturation when the voltage applied to the threshold detector drops below the threshold level.

6 Claims, 2 Drawing Figures

OFF-LINE SERIES TYPE REGULATING POWER SUPPLY

TECHNICAL FIELD

This invention relates to power supplies and more particularly to a power supply intended to operate directly from an AC line source.

BACKGROUND OF THE INVENTION

A common power supply operating directly off AC line power is the switching type voltage regulator often referred to as the off-line switcher. Its widespread use is due in part to its high efficiency, precision of regulation, and fast response. A disadvantage of this type power supply is its low input impedance which induces a large in-rush current upon initial turn on or power. This is particularly critical in applications where groups of off-line switchers are connected in parallel to an AC line voltage source. To avoid tripping circuit breakers, it is often necessary to turn on the paralleled off-line switchers in controlled sequences rather than simultaneously. This requires a cumbersome arrangement for start up.

The more traditional series dissipative type voltage regulator avoids the initial turn on problem described since it does not draw large currents at turn on. However, the many disadvantages of the series dissipation regulators such as low efficiency, high thermal dissipation and low power capabilities, limits its use in off-line applications.

SUMMARY OF THE INVENTION

An off-line regulating power supply embodying the principles of the invention utilizes a regulating transistor which operates in a dissipative mode for only a portion of each half cycle of the input AC in order to regulate an output voltage by truncating the input AC sinewave. In a particular embodiment an AC input signal is full wave rectified and coupled to a primary power transformer through a periodically operating regulating transistor. One of a plurality of secondary windings is coupled to a voltage threshold detector which responds instantaneously to a voltage level attainment of the threshold in each half cycle of operation to bias the regulation transistor from a fully or near saturated condition to an active dissipative regulating state which limits the output voltage to the threshold level. As the input AC sinewave peaks and declines in value, the regulating transistor is again biased into saturation when the rectified half wave voltage drops below the threshold.

The power supply is configured in the illustrative embodiment to provide multiple isolated outputs all under a single regulation control which is coupled to one of the secondary windings.

BRIEF DESCRIPTION OF THE DRAWING

An understanding of the invention may be readily attained by reference to the following specification and drawing in which.

DETAILED DESCRIPTION

Figure 1:
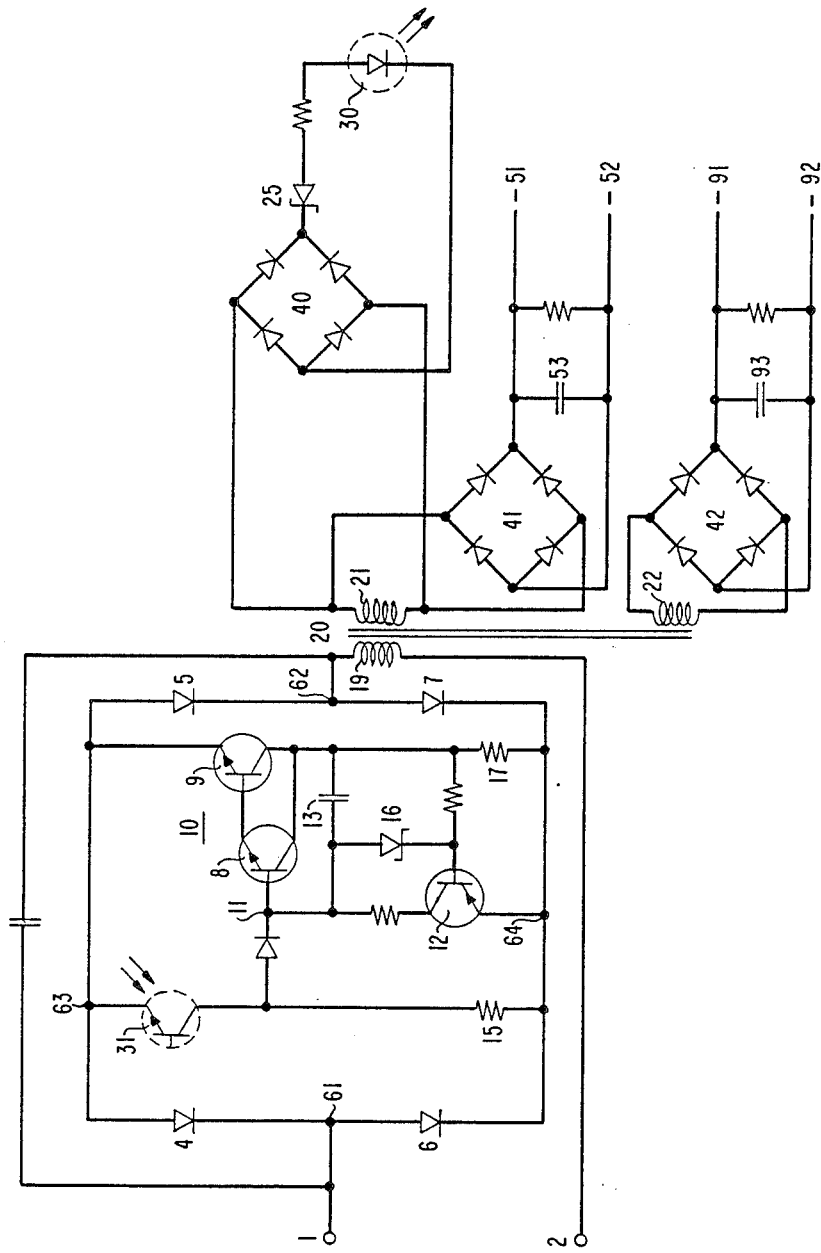
FIG. 1 is a schematic of a power supply embodying the principles of the invention.

An off-line dissipative voltage regulator embodying the principles of the invention is disclosed in FIG. 1. An AC input is applied to input terminals 1 and 2 which in turn are connected at nodes 61 and 62 (via primary winding 19) to a full wave rectifier comprising rectifying diodes 4, 5, 6, and 7. A power regulating transistor 10, comprising two darlington connected transistors 8 and 9 is connected across nodes 63 and 64 of the rectifier and is operative as a periodically controlled intermittent impedance, as described below, to control the peak value of the AC signal applied to the primary winding 19 of the power transformer 20.

The power transformer 20 is shown having two secondary windings 21 and 22; however, it is readily apparent that additional secondary windings may be readily added to energize additional loads. Secondary winding 21 is connected via rectifier 41 to output terminals 51 and 52; secondary winding 22 is connected via rectifier 42 to output terminals 91 and 92.

Secondary winding 21 is also connected via full wave rectifier 40 to a peak voltage regulating circuit comprising a zener breakdown diode 25 and a light emitting diode 30, which generates a light output proportional to the amplitude of the current passing through it.

The light emitting diode 30 is coupled optically to a phototransistor 31 which couples node 63 of the input rectifier to the base control electrode of the power regulating transistor 10. A bias resistor 15 couples node 64 to the bridge rectifier to the base control lead of power regulating transistor 10 and operates to bias it into a near saturation state where the voltage drop across power regulating transistor is very low.

A better understanding of the invention may be attained by describing its operation. An AC voltage source is coupled to input terminals 1 and 2 and is applied to the primary winding 19 of transformer 20 through power regulating transistor 10. A rectifier comprising diodes 4, 5, 6, and 7 is coupled with power regulating transistor 10 and input terminal 1 and primary winding 19 so that the alternating current flow is rectified, and hence the current flow through power regulating transistor 10 is always unidirectional. Power regulating transistor 10 operates as a periodically regulating impedance with the impedance being cyclically controlled to limit the peak voltage applied to primary winding 19. This peak value is controlled by a feedback regulating control described subsequently. Prior to attainment of the desired peak value the power regulating transistor 10 is biased into near saturation, and hence provides a very low conductive impedance. Base drive to control electrode 11 is provided by bias resistor 15. This current biases the power regulating transistor 10 so it is conductive with a minimum collector to emitter voltage drop during the initial and terminal stages of an AC half cycle.

A transistor 12 couples node 64 to base electrode 11 and provides additional base current to power regulating transistor 10 to keep it within its safe operating area even with a very high input current drawn by transformer 20. In such high current conditions the voltage drop across resistor 17 biased transistor 12 into its active region and consequently injecting additional current into the control electrode 11.

If the voltage across nodes 61 and 62 increases to a level that would exceed the safe operating region of power regulating transistor 10, the reference diode 16 causes transistor 12 to be biased into its active region and consequently injecting additional base current into control electrode 11. It is apparent that transistor 12 is operative to protect regulating transistor 10 from transient over current conditions. The voltage across secondary winding 21 is coupled to a full wave rectifier 40, which in turn is coupled to a breakdown diode 25, which determines a reference voltage level at the output of rectifier 40. When the rectified voltage exceeds the threshold voltage of breakdown diode 25 plus the forward voltage drop of light emitting diode 30, the breakdown diode conducts and the light emitting diode 30 generates a light output whose intensity is proportional to the current level flowing through it.

The light output of the light emitting diode 30 is optically coupled to a phototransistor 31 and coupled to the control electrode 11 of the power regulating transistor 10. It causes transistor 31 to conduct current in proportion to the light intensity which in turn is proportional to the current flowing through breakdown diode 25 and light emitting diode 30. Transistor 31 is connected to divert current from the control electrode 11 of power regulating transistor 10, and is operative only upon attainment of a threshold, defined by breakdown diode 25 to conduct and reduce the conductance of the power regulating transistor 10 to limit the peak voltage applied to the primary winding 19. The reduced primary voltage correspondingly reduces and limits the voltage across the secondary windings 21 and 22 so that the output voltage at terminals 51–52 and 91–92 remains constant. The outputs of rectifiers 41 and 42 are connected to capacitor filters 53 and 93, which are suitably sized to stabilize the output voltages at some constant value.

A filter capacitor 3 is shunted across the input terminal 1 and node 62 to prevent discontinuity of the transformer primary current and reduce the power dissipated in the power regulating transistor 10. Capacitor 13 is added to prevent transistor 10 from oscillating.

While the circuit has been shown with two load outputs, it is readily apparent that additional outputs may be added and still be regulated by the common regulation control.

The economic advantage of the input regulator increases with the number of outputs.

Figure 2:
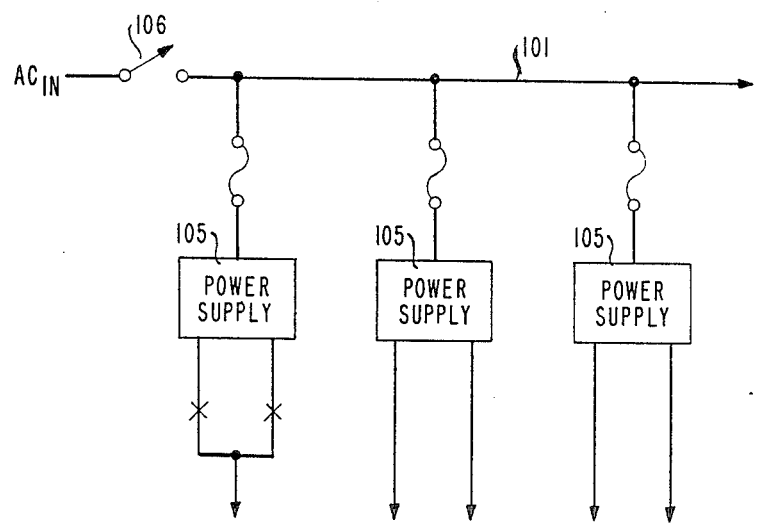
FIG. 2 is a block diagram of a system of plurality of power supplies with a common bus input in which the power supply of FIG. 1 may be applied.

A system arrangement is shown in FIG. 2 in which a plurality of power supplies 105 such as are shown in FIG. 1, are connected to a common AC bus input 101. Because of the improved in-rush current, characteristics of an impedance type regulating scheme a common switch 106 may be utilized to energize a large number of individual units simultaneously.

Because of the common magnetic flux coupling secondary windings 21 and 22 and the absence of additional secondary regulation, the outputs of the power supplies can be readily connected to become a common output by connecting terminal 51 to 91 and terminal 52 to 92. Such connections can provide twice the output current than a single output could, with the load current shared approximately equally by windings 21 and 22, respectively.

What is claimed is:
1. A power supply comprising:
   an input for accepting an AC signal,
   an output circuit for accepting a load to be energized,
   a power transformer including a primary winding and a secondary winding,
   a power regulating transistor for coupling the input to the primary winding,
   means for constraining current flow in the power regulating transistor to be unidirectional,
   a bias circuit for causing the power regulating transistor to operate in a saturated low impedance conduction mode and responsive to a control signal to cause the power regulating transistor to operate in an active high impedance conduction mode for series regulating current flow in the power regulating transistor,
   a voltage threshold detection device coupled to the secondary winding and separate from the output and operative for generating a control signal when a voltage of the secondary winding achieves a predetermined threshold value,
   the voltage threshold detection device having a threshold level such that the voltage threshold detector device is continuously operative in a breakdown mode in each half cycle of the AC signal between a finite time after a beginning of the half cycle and a finite time preceding a termination of the half cycle,
   feedback circuitry for coupling the control signal to the bias circuit including a light emitting device responsive to the voltage threshold detector device and a light responsive device operative to utilize the control signal to bias the power regulating transistor into its active high impedance conduction mode for series regulating current flow through the power regulating transistor.

2. A power supply as defined in claim 1 wherein said means for constraining current flow comprises a full wave rectifier connected to cause unidirectional current flow in the power regulating transistor and permit bidirectional current flow in the primary winding.

3. A power supply as defined in claim 1 wherein the voltage threshold detection device comprises a voltage breakdown diode which is connected in series with the light emitting device.

4. A power supply as defined in claim 1 wherein the light responsive device comprises a photo transistor responsive to the light emitting device and coupled to divert drive current from a control electrode of the power regulating transistor.

5. A power supply as defined in claim 1 and including,
   a first output full wave rectifier connected to the secondary winding,
   the voltage threshold detection device and light emitting device being connected to be energized by an output of the first output full wave rectifier,
   a second output full wave rectifier connected to the secondary winding,
   the output circuit including a capacitive filter and being connected to be energized by an output of the second output full wave rectifier.

6. A power supply as defined in claim 1 wherein the power transformer includes at least a second secondary winding.

* * * * *